April 5, 1949.  A. P. TURNER  2,466,339
MACHINE FOR MOLDING CONCRETE BLOCKS
Filed July 9, 1947  5 Sheets-Sheet 1
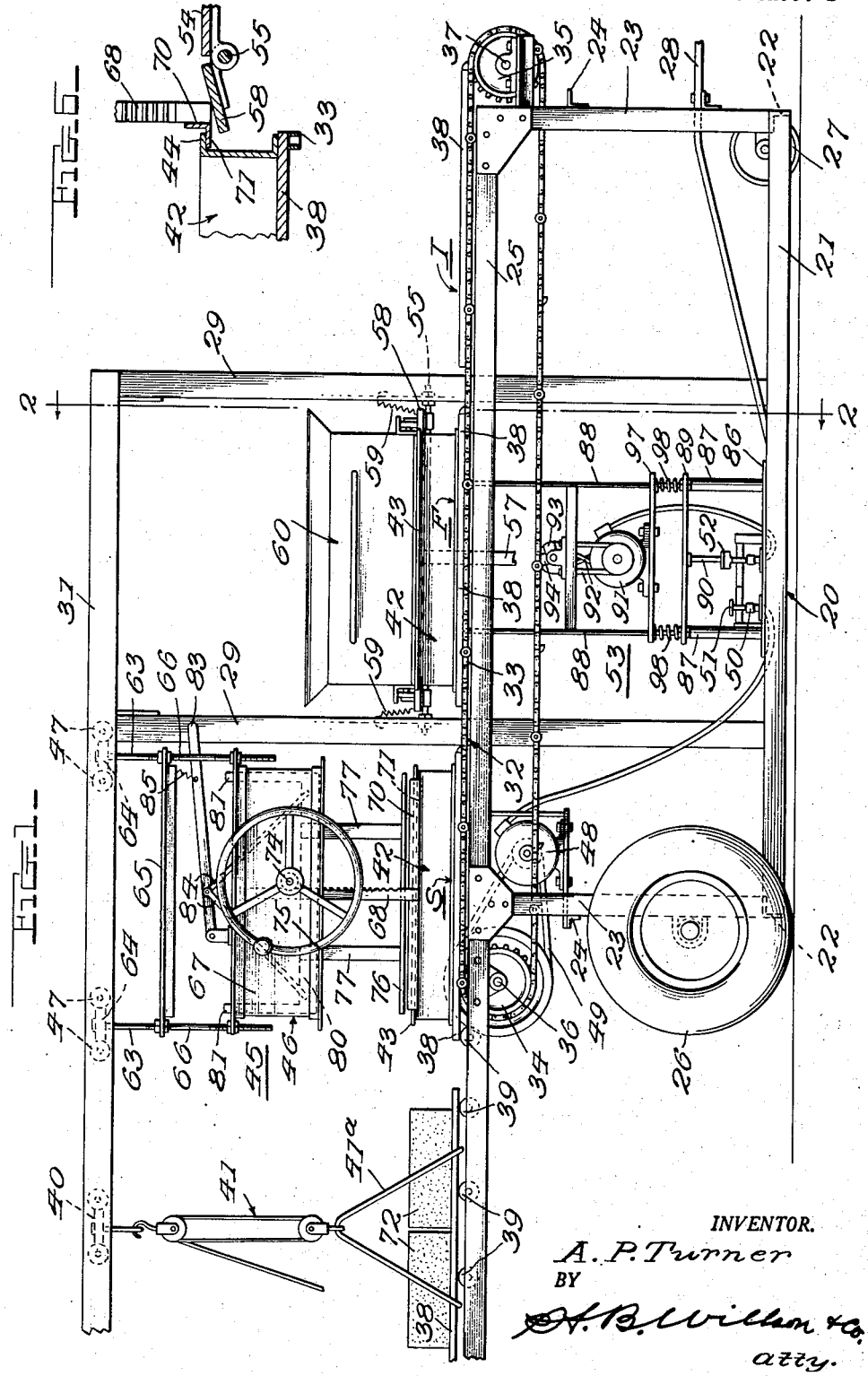
INVENTOR.
A. P. Turner
BY
H. B. Willson & Co.
atty.

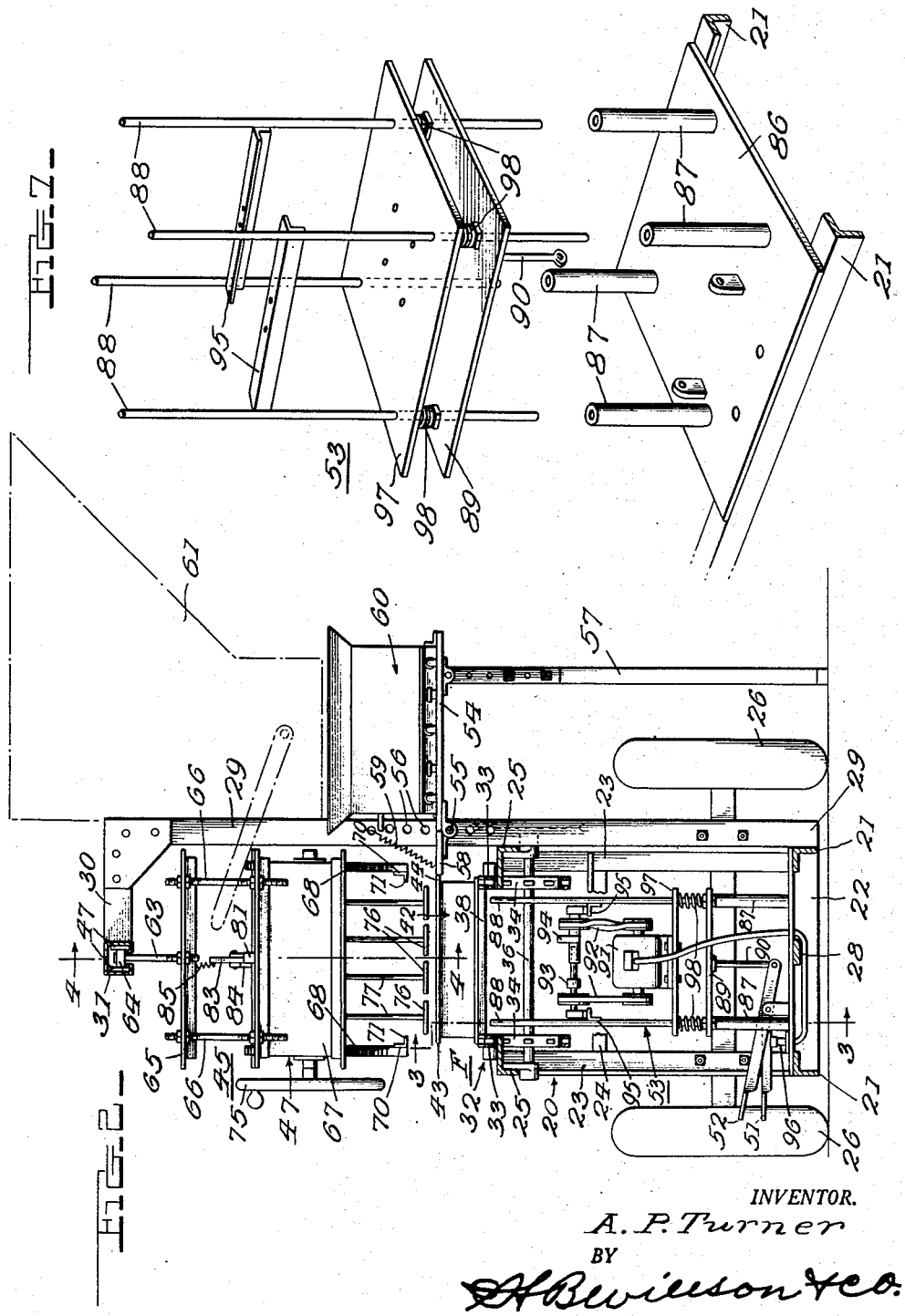

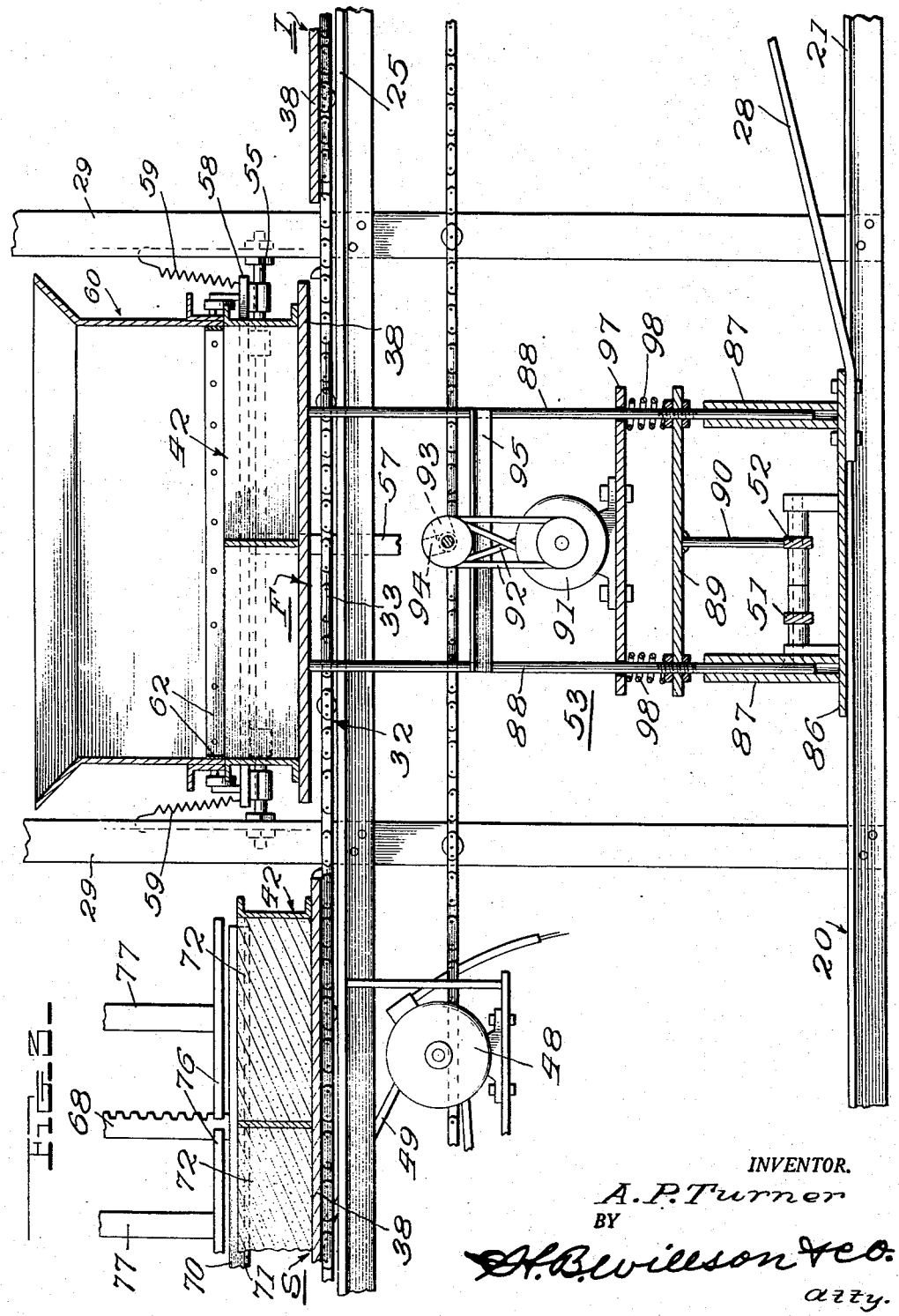

April 5, 1949.  A. P. TURNER  2,466,339
MACHINE FOR MOLDING CONCRETE BLOCKS
Filed July 9, 1947  5 Sheets-Sheet 4
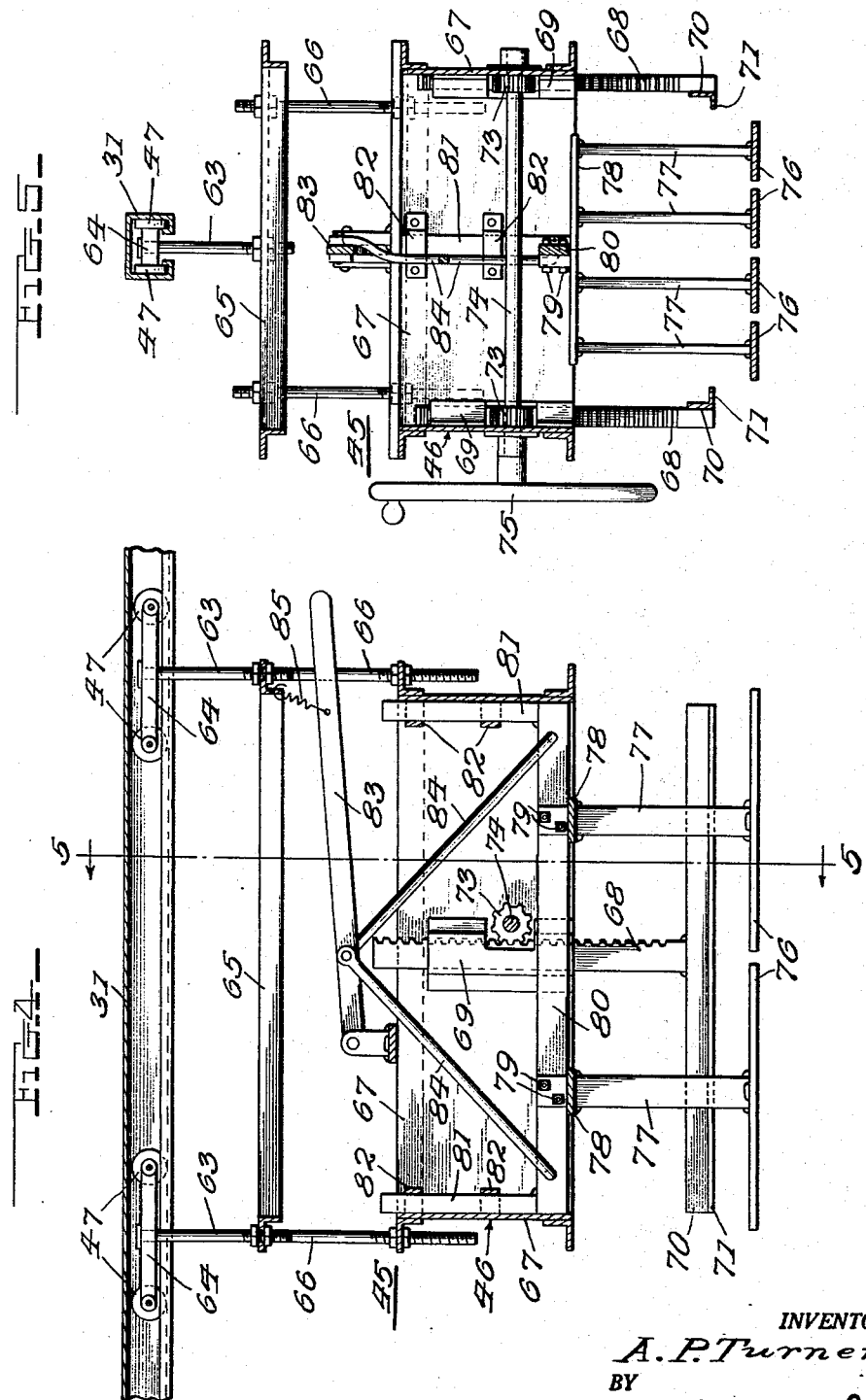
INVENTOR.
A. P. Turner
BY
H. B. Willson & Co.
atty.

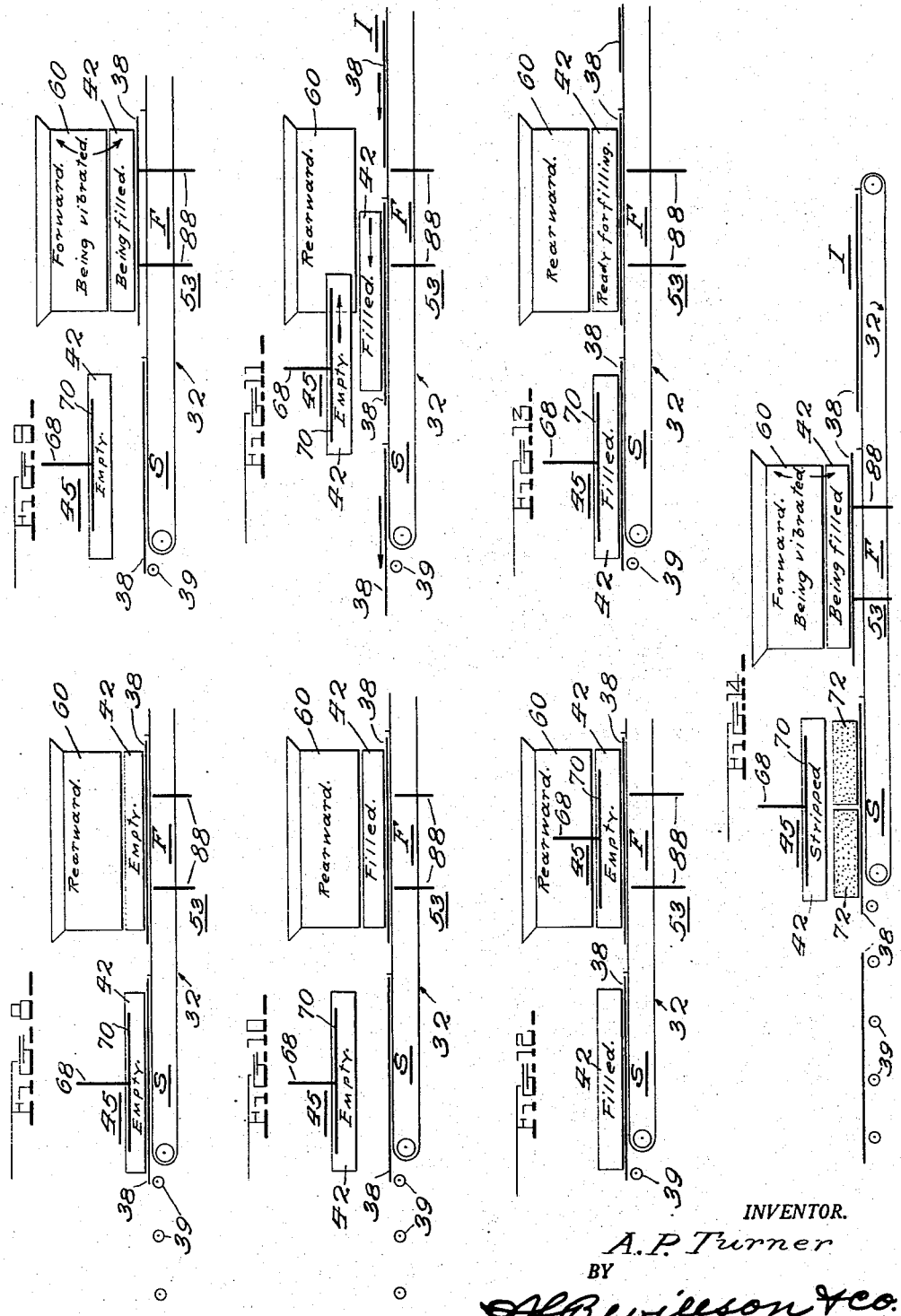

Patented Apr. 5, 1949

2,466,339

UNITED STATES PATENT OFFICE 2,466,339

MACHINE FOR MOLDING CONCRETE
BLOCKS

Arch Price Turner, San Antonio, Tex.

Application July 9, 1947, Serial No. 759,811

12 Claims. (Cl. 25—41)

The invention relates to machines for moulding blocks or other products from concrete mixtures or other plastic compositions, and for illustrative purposes the invention has been disclosed for moulding brick-like blocks.

The principal object of the invention is to provide a new and improved machine capable of producing a perfect product with much greater speed than machines heretofore devised.

A conveyor is provided to support one pallet at an initial station, a second pallet at a filling station, and a third pallet at a stripping station; two separate moulds are provided to rest upon said second and third pallets at said filling and stripping stations, respectively; and said conveyor is operable to move the pallets and moulds as required: and a further object is to provide a novel stripper which is operable to upwardly strip a mould at said stripping station and to return this mould to a position over said filling station while the conveyor is (1) moving a pallet into position to receive said mould, (2) moving the next filled mould to said stripping station, and (3) advancing the product-laden pallet, from which the mould was stripped, for removal, said stripper being then operable to lower the returned mould to the stripping station and being finally engageable with said next filled mould for repetition of the cycle.

A shear frame is slidable forwardly from a platform onto the mould at said filling station to discharge the plastic mix into said mould, and to strike-off the excess when forced back onto said platform; and another object of the invention is to provide the front end of said platform with a downwardly yieldable extension which prevents it from interfering with descent of the rear mould-engaging element of the stripper while the latter is lowering a mould to the filling station.

A further object is to make novel provision for vibrating the shear frame and mould to facilitate mould filling and product compaction, and for preventing transmission of the vibration to the conveyor and the main frame of the machine.

A still further object is to provide a relatively simple and light machine which may be readily towed or otherwise easily moved from place to place, often making it possible to produce the product at the location where it is to be used.

Figure 1 of the accompanying drawings is a side elevation of the machine.

Fig. 2 is a vertical transverse section on line 2—2 of Fig. 1.

Fig. 3 is an enlarged fragmentary longitudinal section on line 3—3 of Fig. 2.

Fig. 4 is an enlarged longitudinal section on line 4—4 of Fig. 2, showing the stripper.

Fig. 5 is a transverse section on line 5—5 of Fig. 4.

Fig. 6 is a detail section similar to a portion of Fig. 2 showing the action of the downwardly yieldable platform extension.

Fig. 7 is a perspective view showing portions of the vibrating means.

Figs. 8 to 14 are operational diagrams.

The general construction shown in the drawings may be considered as preferred and while that construction will be rather specifically described, it is to be understood that numerous variations may be made within the scope of the invention as claimed.

An elongated frame 20 is provided comprising lower longitudinal bars 21 connected by end bars 22, corner posts 23 rising from the ends of said bars 21 and connected by transverse tie bars 24, and upper longitudinal track bars 25 secured to the upper ends of said posts 23. This frame 20 is portably mounted on suitable wheels 26 and 27 and is provided with a towing tongue 28. Two standards 29 are spaced apart longitudinally of the frame 20 and are secured to the rearmost of the longitudinal bars 21 and 25, said standards extending above the bars 25 and having forwardly projecting brackets at their upper ends, one of which is shown at 30 in Fig. 2. These brackets 30 carry an elevated track 31 which extends longitudinally and centrally over the frame 20, for a purpose to appear.

An endless conveyor 32 is mounted on the frame 20 and extends longitudinally thereof, said conveyor having chains 33 trained around sprockets 34 and 35 carried by shafts 36 and 37 suitably mounted near the upper ends of the posts 23. The upper reaches of the chains 33 travel on the upper sides of the track bars 25, and if desired these bars may have suitable guide flanges (not shown) for said chain reaches. These reaches are of a length to support three pallets 38, one at an initial station I, the second at a filling station F, and the third at a stripping station S. The track bars 25 are extended beyond the stripping station S and provided with rollers 39 for carrying the product-laden pallets from said stripping station; a portion of the track 31 overlies these rollers and supports a carriage 40; and a block-and-tackle or the like 41 and sling 41ª are suspended from said carriage for use in removing the product-laden pallet preparatory to moving it aside for product setting.

Two moulds 42 are provided to rest on the pallets 38 at the stations F and S, each mould being in the form of a bottomless and topless frame having a forwardly projecting longitudinal flange 43 on its front wall and a rearwardly projecting longitudinal flange 44 on its back wall, said flanges 43 and 44 being engageable by portions of a stripper 45 which includes a carriage 46 having rollers 47 movable along the track 31. This stripper is useable to upwardly strip the mould 42 at the stripping station S from the moulded pallet-supported product at said station S, after which the conveyor 32 is driven to advance the product-laden pallet upon the rollers 39 from this station S, to move the next filled mould from the filling station F to said station S, and to move another pallet to said filling station F. During this conveyor movement, the stripper 45 is moved along track 31 to return the stripped mould to a position over the filling station F, and when said conveyor movement has stopped, said stripper is used to lower the returned mould onto the newly placed pallet at said filling station F. The stripper 45 is then disengaged from this mould and engaged with the filled mould at the stripping station S, in readiness for repetition of the cycle.

For driving the conveyor 32, an electric motor 48 is shown, belted at 49 to the shaft 36; and a starting and stopping switch 50 is provided for said motor, said switch being of self-opening type and being closable by means of a pedal 51 depressible by an operator standing in front of the machine. Adjacent this pedal, there is a second pedal 52 which brings vibrating means 53, hereinafter described, into play.

Behind the filling station F, a platform 54 is mounted in such a position that its upper side will be in the same plane with the top of the mould 42 at said filling station F. In the present disclosure, the front end of this platform 54 is mounted upon a rod 55 which is engageable with openings 56 in the standards 29, and the rear end of said platform is supported by a vertically adjustable leg 57, permitting vertical adjustment of said platform 54 when using moulds of a different depth. The platform 54 is spaced behind the mould at station F and a platform extension 58 is provided at the front edge of said platform to extend forwardly therefrom to said mould, said extension 58 being flush with the upper surfaces of said platform and mould and being mounted for downward yielding for a purpose to appear. In the present disclosure, the extension 58 is pivotally mounted on the rod 55 and is held in raised position by means of springs 59.

A shear-frame 60 is suitably mounted on the platform 54 to receive the desired plastic mix from the gate of a supply hopper 61, shown in broken lines in Fig. 2. This shear-frame 60 is forwardly shiftable from the platform 54 across the extension 58 onto the mould 42 at the filling station F, to conduct the mix into said mould, and is rearwardly returnable to said platform 54 to strike-off excess at the top of the mould. To facilitate this latter operation, the shear-frame 60 is preferably provided with an internal squeegee 62. While the shear-frame 60 is resting on the mould 42 at the filling station F, said shear-frame and mould and the pallet 38 supporting the latter are lifted free of the conveyor chains 33 and the machine frame (Fig. 3) and are vigorously vibrated in all directions by the vibrating means 53, to facilitate mould filling and to compact the plastic entering the mould.

The stripper 45 is preferably of the construction shown most clearly in Figs. 4 and 5. The carriage 46 of this stripper includes central vertical hanger rods 63 suspended from carriage members 64 supported by the rollers 47, a rectangular frame 65 carried by said hanger rods 63, other hanger rods 66 suspended from the corner portions of said frame 65, and a rectangular frame 67 adjustably mounted on the lower ends of said hanger bars 66. Front and rear rack bars 68 are mounted at 69 for vertical sliding on the frame 67, and the lower ends of these rack bars 68 are provided with horizontal angle bars 70 having inwardly projecting flanges 71 to underlie the mould flanges 43 and 44 when the lower ends of said rack bars 68 straddle one of the moulds 42. The flanges 71 are engageable with the flanges 43 and 44, by moving the carriage 46 along the track 31 after first so positioning the parts as to allow said flanges 71 to move endwise under said flanges 43 and 44; and after this flange engagement, lifting of the rack bars 68 will lift the mould, stripping it upwardly from the moulded blocks or the like 72. Pinions 73 on a shaft 74 mesh with the rack bars 68 for raising and lowering them, said shaft being mounted on the frame 67 and having a hand wheel 75.

To hold the blocks 72 against ascent with the mould 42 and to smooth the tops of said blocks, I provide hold-down feet 76 on the lower ends of legs 77, said legs being secured at their upper ends to transverse bars 78 which are detachably bolted at 79 to a master bar 80 within the frame 67. The ends of this master bar 80 are provided with upstanding arms 81 slidable in guides 82 secured to the frame 67, and a hand lever 83, fulcrumed on said frame, is suitably connected with said master bar for depressing it when required. In the present disclosure, thrust rods 84 connect the lever 83 with the master bar 80, and a spring 85 normally holds said lever 83 in raised position. When upwardly stripping the mould from the blocks 72, the hand lever 83 is pulled downwardly, thereby engaging the feet 76 with said blocks, smoothing their upper sides and holding them against ascent.

The vibrating means 53 is preferably of the construction shown most clearly in Figs. 3 and 7. A base plate 86 is secured upon the lower longitudinal frame bars 21 under the filling station F, and to this plate four upstanding tubular guides 87 are secured. The lower ends of vertical rods 88 are slidably received in these guides 87, and the upper ends of said rods 88 are normally somewhat below the pallet 38 at the filling station F. At the upper ends of the guides 87, a horizontal plate 89 is secured to the rods 88, said plate being connected at 90 with the pedal 52 above described. The plate 89 yieldably supports an electric motor 91 which is connected by belts 92 with oppositely rotatable rotrons 93 and 94, said rotrons being mounted on bars 95 secured to the rods 88. A normally open switch 96 is provided for the motor 91, said switch being in the downward path of the pedal 52. The motor 91 is mounted on a plate 97 which is slidable on the rods 88, and supporting springs 98 are provided for said plate 97 in order that it may float as the rods 88 and other parts are being vibrated. Otherwise, the inertia of the motor would interfere with the vibration. When the pedal 52 is depressed, the rods 88 rise and the switch 96 closes. Thus, depression of this pedal 52 during mould filling, will cause the rods 88 to lift the pallet 38, mould 42 and shear-frame 60 as seen in Fig. 3, and will also cause operation of the rotrons 93 and 94 to vibrate the lifted elements, thereby facilitating the mould-filling operation and compacting the plastic in the mould.

If desired, provision may be made for holding a stack of the pallets 38 at the initial station I and for causing the conveyor 32 to advance the lowermost pallet each time said conveyor is operated, but for illustrative purposes, it will be assumed that the pallets are placed one at a time on said conveyor, at said initial station I.

*Operation*

In preparing to use the machine, the hopper 61 is charged with the desired plastic and the shear-frame 60 is filled from said hopper; pallets 38 are laid on the conveyor 32 at the stations I, F and S; empty moulds 42 are placed on the pallets at the stations F and S; and the stripper bars 70 are engaged with the mould at the station S (see Fig. 8). The stripper 45 is then operated to lift the mould at station S from its pallet, and said pallet may then be removed if desired. Now, with this mould raised (Fig. 9), the shear-frame is pulled forwardly to fill the other mould at station F, and during the filling operation, the vibrating means 53 is operated to lift the elements 38, 42 and 60 and to vibrate them as illustrated in Fig. 9. These elements are then lowered until the pallet 38 rests on the conveyor 32 (Fig. 10). Then, the conveyor 32 is operated (Fig. 11) to advance the filled mould toward the stripping station S and to move another pallet from the initial station I toward said filling station. While this is being done, the stripper 45 is moved along the track 31 to carry the previously lifted empty mould back to a position above the filling station F as illustrated in Fig. 11. When the filled mould has reached the stripping station S (Fig. 12), the stripper 45 is operated to lower the empty mould onto the pallet at the filling station F. Then, the stripper is disengaged from this empty mould at station F and engaged with the previously filled mould at station S, as seen in Fig. 13. This filled mould is then upwardly stripped from the pallet-held product (Fig. 14), and the empty mould at station F is filled and vibrated, after which the steps depicted in Figs. 10 to 14 are repeated, resulting in rapid moulding of the product and advancing the product-laden pallets for removal.

There is preferably 7" clearance between the base-frame and the road.

From the foregoing, it will be seen that novel and advantageous provision has been made for attaining the desired ends, but attention is again invited to the possibility of making variations within the scope of the invention as claimed.

I claim:

1. A moulding machine comprising a horizontal conveyor to support one pallet at an initial station, a second pallet at a filling station and a third pallet at a stripping station, means for driving said conveyor at will, separate moulds to rest for upward removal upon said second and third pallets at said filling and stripping stations respectively, a mould lifting and lowering stripper, and means mounting said stripper above said conveyor for movement from said stripping station to said filling station and vice versa; whereby a filled mould at said stripping station may be upwardly stripped and may then be returned to a position above said filling station while said conveyor is being operated to move the next filled mould from said filling station to said stripping station and said one pallet from said initial station to said filling station, and whereby said returned mould may then be lowered to said filling station and said stripper may be disengaged from said returned mould and engaged with the filled mould at said stripping station.

2. A structure as specified in claim 1; together with additional conveying means for conducting the product-loaded pallets from said stripping station, said stripper mounting means including an elevated track and a carriage movable along the same, said track having a portion extended beyond said stripping station over said additional conveying means, an additional carriage movable along said extended portion of said track, and means suspended from said additional carriage for lifting the product-loaded pallets from said additional conveying means.

3. A structure as specified in claim 1; together with mould-vibrating means mounted under said filling station and including means for lifting a filled mould and the pallet thereof, at said station, from said conveyor during vibration.

4. A structure as specified in claim 1; together with a shear-frame movable forwardly onto a mould at said filling station for discharging plastic into this mould, and vibrating means mounted under said filling station, said vibrating means including means for bodily lifting the pallet, mould and shear-frame at said filling station during vibration.

5. In a moulding machine, a conveyor for supporting a pallet at a filling station and for moving a filled pallet-supported mould from said filling station to a stripping station, a mould-lifting, conveying and lowering stripper for upwardly stripping a mould at said stripping station, returning it to a position above said filling station and lowering it to said filling station, said stripper including a mould-engaging element to externally engage the back wall of the mould, a fixed horizontal platform spaced behind said filling station in a plane flush with the upper side of a mould positioned at said filling station, a platform extension mounted at the front edge of said platform and extending forwardly therefrom sufficiently to reach the mould, said extension normally occupying a raised position in which it is flush with said platform and being downwardly movable when struck by said mould-engaging element as said stripper lowers the mould to said filling station, means for restoring said extension to said raised position when the stripper is disengaged from the lowered mould, and a shear-frame mounted on said platform for forward movement across said extension onto the lowered mould.

6. A structure as specified in claim 5; said platform extension being hinged to the front edge of said platform, said means for restoring said extension to said raised position comprising a spring which normally holds said extension in said raised position and yields as said extension is forced down by said mould-engaging element.

7. A structure as specified in claim 5; together with a horizontal rod supporting the front end of said platform, said platform extension being pivotally mounted on said rod to swing vertically from raised to lowered position, and a leg supporting the rear end of said platform.

8. In a moulding machine having a filling station and a stripping station and means for supporting pallets at said stations; an elevated track extending horizontally between points above said stations, a carriage suspended from and movable along said track, mould lifting and lowering elements mounted for vertical movement on said carriage and extending downwardly therefrom for engagement with a pallet-supported mould at said stripping station, and means for operating said mould lifting and lowering elements, whereby a mould may be upwardly stripped from a product-laden pallet at said stripping station, conveyed to a point above said filling station and lowered to the latter.

9. In a moulding machine having a filling station and a stripping station and means for supporting pallets at said stations; an elevated track extending horizontally between points above said stations, a carriage suspended from and movable along said track, front and rear rack bars mounted for vertical sliding on said carriage and extending downwardly therefrom, the lower ends of said rack bars having mould-lifting means to engage a mould at said stripping station, and a manually rotatable shaft mounted on said carriage and having pinions meshed with said rack bars; whereby a mould may be upwardly stripped from a product-laden pallet at said stripping station, conveyed to a point above said filling station and lowered to the latter.

10. In a moulding machine, means for supporting a pallet, a mould upwardly removable from said pallet, said mould having a back wall provided with a rearwardly projecting horizontal flange, and a front wall provided with a forwardly projecting horizontal flange, a carriage above said mould and mounted for horizontal movement unidirectionally with said front and back walls, front and rear mould-lifting and lowering members mounted for vertical movement on said carriage and extending downwardly therefrom to straddle the mould, said members having inwardly projecting horizontal flanges to underlie said flanges of said mould walls when said members are lowered at one end of the mould and the carriage is shifted to move said inwardly projecting flanges to positions under said flanges of said mould, and means for raising and lowering said members.

11. In a moulding machine, a conveyor for conveying pallets to a filling station and for conveying filled pallet-supported moulds from said filling station, vertically shiftable means mounted under said filling station for lifting a pallet and associated mould free of said conveyor while the mould is being filled, means for lifting and lowering said vertically shiftable means, and means for vibrating said vertically shiftable means while raised.

12. In a moulding machine, a base, spaced upstanding guides secured to said base, vertical rods slidably engaged with said guides and projecting upwardly therefrom to support a mould while filling the latter, a motor support having openings through which said rods extend, means establishing yieldable connections between said rods and said motor support, vibrator-supporting means secured to said rods above said motor support, a vibrator rotatably mounted on said vibrator-supporting means, an electric motor mounted on said motor support and operatively connected with said vibrator, means connected with said rods for lifting them to dispose the mould at an elevated position for vibration and filling, and a control switch for said motor.

ARCH PRICE TURNER.

REFERENCES CITED

The following references are of record in the file of this patent:

UNITED STATES PATENTS

| Number | Name | Date |
| --- | --- | --- |
| 1,484,735 | Norton | Feb. 26, 1924 |
| 1,905,975 | Thomas | Apr. 25, 1933 |
| 1,957,421 | Daniels et al. | May 1, 1934 |
| 2,136,009 | Holland, Jr. | Nov. 8, 1938 |

FOREIGN PATENTS

| Number | Country | Date |
| --- | --- | --- |
| 507,557 | France | Sept. 18, 1920 |